United States Patent
Fallah et al.

(10) Patent No.: US 10,863,347 B2
(45) Date of Patent: Dec. 8, 2020

(54) POLICY ENHANCEMENT FOR MIXED CAPABILITY DEVICES

(71) Applicant: T-Mobile USA, Inc., Bellevue, WA (US)

(72) Inventors: Maziar Fallah, Preston, WA (US); Neha Shah, Issaquah, WA (US); Adrian T. Synal, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/368,699

(22) Filed: Mar. 28, 2019

(65) Prior Publication Data

US 2020/0314632 A1 Oct. 1, 2020

(51) Int. Cl.
| | |
|---|---|
| *H04L 12/44* | (2006.01) |
| *H04W 8/24* | (2009.01) |
| *H04W 8/26* | (2009.01) |
| *H04L 29/06* | (2006.01) |
| *H04W 76/11* | (2018.01) |

(Continued)

(52) U.S. Cl.
CPC ........... *H04W 8/24* (2013.01); *H04L 65/1016* (2013.01); *H04L 67/26* (2013.01); *H04W 4/14* (2013.01); *H04W 8/26* (2013.01); *H04W 76/11* (2018.02)

(58) Field of Classification Search
CPC ............. H04L 65/1006; H04L 65/1016; H04L 65/1069; H04L 65/1089; H04L 65/403; H04L 67/02; H04L 67/303; H04L 69/24; H04N 7/147; H04W 88/18; H04W 8/12; H04W 8/183; H04W 8/205; H04W 8/18; H04W 8/26; H04W 12/06; H04W 48/02; H04W 48/17
See application file for complete search history.

(56) References Cited

U.S. PATENT DOCUMENTS

2016/0080559 A1* 3/2016 Mufti .................. H04L 12/1822
455/416
2016/0337521 A1 11/2016 Kim et al.
(Continued)

FOREIGN PATENT DOCUMENTS

WO WO2014058300 A1 4/2014

OTHER PUBLICATIONS

The PCT Search Report and Written Opinion dated Jul. 14, 2020 for PCT Application No. PCT/US2020/024391, 14 pages.

*Primary Examiner* — Phuc H Tran
(74) *Attorney, Agent, or Firm* — Lee & Hayes, P.C.

(57) ABSTRACT

A policy enhancement for mixed capabilities of devices may include a first User Equipment (UE) that publishes to a presence server via an IP Multimedia Subsystem (IMS) Core network and a Rich Communication Services (RCS) node. A second UE may subscribe to the first UE by requesting information about the first UE from the presence server. The presence server may determine that the first UE is one of multiple instantiations of a same device. The presence server may determine that a third UE is another instantiation of the same device as the first UE, and that the third UE is a lesser-capable device (e.g., non-Universal Profile enabled) with respect to the first UE. The presence server may send a notify message including a capability indicator associated with the third UE to the second UE, and/or the notify message may omit a capability indicator associated with the first UE.

20 Claims, 6 Drawing Sheets

(51) Int. Cl.
*H04L 29/08* (2006.01)
*H04W 4/14* (2009.01)

(56) References Cited

U.S. PATENT DOCUMENTS

| | | |
|---|---|---|
| 2016/0344776 A1 | 11/2016 | Gonzalez De Langarica et al. |
| 2018/0302349 A1* | 10/2018 | Ban .................. H04L 51/04 |
| 2018/0337818 A1 | 11/2018 | Ban et al. |
| 2018/0338295 A1 | 11/2018 | Lin |
| 2019/0253368 A1* | 8/2019 | Kim .................. H04L 51/066 |
| 2019/0261452 A1* | 8/2019 | Nagaraju ............ H04W 8/24 |

* cited by examiner

600

RECEIVE, FROM A REQUESTING USER EQUIPMENT (UE), A SUBSCRIBE MESSAGE SEEKING CAPABILITY DISCOVERY OF A FIRST UE IDENTIFIED BY A DEVICE IDENTIFIER INCLUDED IN THE SUBSCRIBE MESSAGE
602

IDENTIFY FIRST DATA CORRESPONDING TO THE FIRST UE STORED IN A DATABASE, THE FIRST DATA INCLUDING A MOBILE STATION INTERNATIONAL DIRECTORY NUMBER (MSISDN) AND A FIRST SET OF ONE OR MORE CAPABILITY INDICATOR(S)
604

IDENTIFY SECOND DATA CORRESPONDING TO A SECOND UE STORED IN THE DATABASE, THE SECOND DATA INCLUDING THE MSISDN AND A SECOND SET OF ONE OR MORE CAPABILITY INDICATOR(S)
606

DETERMINE THAT EITHER THE FIRST SET OF ONE OR MORE CAPABILITY INDICATOR(S) OR THE SECOND SET OF ONE OR MORE CAPABILITY INDICATOR(S) OMITS A PARTICULAR CAPABILITY INDICATOR
608

SEND, TO THE REQUESTING UE, A NOTIFY MESSAGE OMITTING THE PARTICULAR CAPABILITY INDICATOR
610

FIG. 6

POLICY ENHANCEMENT FOR MIXED CAPABILITY DEVICES

BACKGROUND

In IP Multimedia Subsystems (IMS), a presence server interacts with other network nodes (e.g., a Rich Communication Services (RCS) node) to provide capability information to requesting devices. For instance, devices send publish messages to the presence server that include information about the publishing devices and enables communication features of the publishing devices. The presence server also receives subscribe messages from requesting devices that include a device identifier identifying a particular device for which capability information is sought. Conventionally, the presence server responds to the subscribe request by sending information representative of the particular device's capabilities in a notify message.

Some devices execute features that support multiple instantiations of a same device. For instance, a messaging application running on multiple device instantiations may update on a desktop, a laptop, and/or multiple phones. One of the devices may receive a message and—that device being one of multiple instantiations—all of the other devices may receive the message as well. However, problems arise when the multiple devices compose a heterogenous mix of capabilities due to different device models, manufacturers, and/or application versions.

For example, when an RCS-enabled device (e.g., Samsung Galaxy S8®) publishes to the presence server, and another device subscribes to the RCS-enabled device, the subscribing device receives a notify message describing capabilities of the RCS-enabled device. The subscribing device relies on the notify message to communicate with the RCS-enabled device using features and applications with shared compatibility, such as File Transfer over HTTP (FTHTTP) and group chats. However, if the RCS-enabled device is one of multiple instantiations, and another instantiation is a non-RCS enabled device (e.g., a laptop computer), then the non-RCS enabled device may receive error messages instead of photograph downloads or drop participants from the group chat. This results in an inconsistent, frustrating user experience across the multiple devices and wasted resources across the network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 6 depicts one or more example operations that may be performed by the systems, methods, and apparatuses of FIG. 1 and may include sending a notify message omitting a particular capability indicator.

DETAILED DESCRIPTION

Overview

Figure 1:
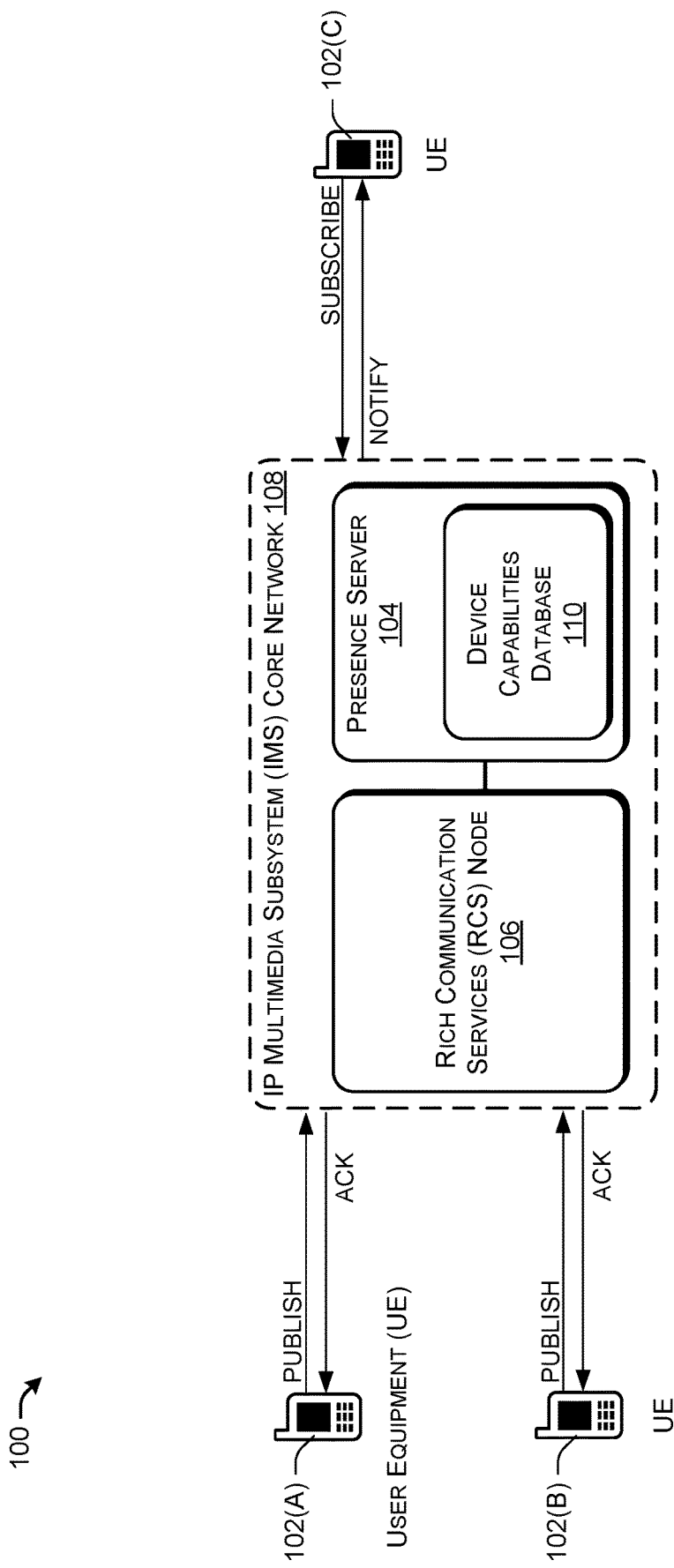
FIG. 1 depicts an example environment in which systems, methods, and apparatuses may implement policy enhancement for mixed capability devices.

This disclosure is directed to systems, methods and apparatuses for implementing policy enhancement for mixed capability devices (hereinafter referred to as "the system"). The system may include an IP Media Subsystem (IMS) core network environment with multiple User Equipments (UE) communicating via device and application communication features. The multiple UEs may comprise a mix of various hardware manufacturers and models, various operating systems of different versions, and various applications of different versions operating on the devices. Accordingly, some devices may include Rich Communication Services (RCS)-enabled features and/or Universal Profile (UP)-enabled features while other devices may not.

In some examples, the system may comprise a first UE that publishes its capabilities to a presence server via a publish message. A second UE attempting to communicate with the first UE may send a subscribe message to the presence server identifying the first UE as a target device for which capability information is sought. In response, the presence server may generate a notify message to send to the subscribing, second UE.

To generate the notify message, the presence server may retrieve data stored in one or more databases. For instance, the presence server may retrieve data stored at a device capabilities database and may determine, based on one or more stored Mobile Station International Subscriber Directory Number (MSISDN) values, that the first UE is one of multiple instantiations of a same device. Furthermore, the presence server may determine that a third UE is another instantiation of the same device, and that the third UE has less capabilities than the first UE (e.g., that the third UE is non-UP-enabled or non-RCS-enabled).

In some examples, the presence server may generate and send a notify message including capability indicators associated with the third UE based, at least in part, on the presence server determining that the third UE is a lesser-capable device. In some examples, this may result in a more consistent user experience among the multiple instantiation devices (e.g., among the first UE and the third UE) because less error events occur at the third UE from RCS-based and UP-based messages (which are initially sent to the first UE) that are duplicated and sent to the non-RCS enabled third UE.

In some embodiments, these improvements to the presence server may result in technical improvements to other nodes of the IMS core network, such as the RCS node. The RCS node may use processing and memory resources to operate an error detection system, error message generating and sending system, and/or an error resolution system. The system disclosed herein reduces the number of attempts of RCS-enabled or UP-enabled devices to send RCS-based or UP-based messages to non-RCS or non-UP enabled devices. Therefore, the improved presence server, which creates a consistent experience among multiple instantiations of the same device, may additionally result in reduced error messages among the multiple instantiations, and a corresponding reduction in memory and processing requirements of the RCS server to operate its error management systems.

Multiple and varied example implementations and embodiments are described throughout this disclosure. Examples and portions of the systems, methods, and apparatuses discussed herein may be rearranged, combined, used together, duplicated, partially omitted, omitted entirely, and/or may be otherwise modified to arrive at variations on the disclosed implementations that combine one or more aspects of the systems, methods, and apparatuses.

Illustrative Systems, Methods, and Apparatuses for Implementing Policy Enhancement with Mixed Capability Devices FIG. 1 depicts an example system 100 for policy enhancement with mixed capability devices. The system 100 may include a first UE 102(A) that publishes to a presence server 104 and is in communication with an RCS node 106 and an IMS core network 108. The first UE 102(A) may publish to the presence server 104 via the IMS core 108. The first UE 102(A) may send a publish message including information about the first UE 102(A), which the presence server 104 may store in a device capabilities database 110 upon receiving the publish message. The presence server 104 may send an acknowledgement (ACK) to the first UE 102(A) to confirm that the publish message was received, and/or that information from the publish message has been extracted and stored in the device capabilities database 110.

In some embodiments, the RCS node 106 may comprise a server device for facilitating one or more RCS functions. For instance, the RCS node 106 may perform routing operations for messages being distributed throughout the IMS core network 108, such as determining a routing address of the terminating node. The RCS node 106 may perform data collection, analysis, and reporting for billing functionalities. The RCS node 106 may facilitate multiple messaging features, such as an enhanced address book, FTHTTP (e.g., 100 MB file sharing, or at least 100 MB or greater file sharing), content sharing, open group chat (e.g., up to 100 people), IP video call, geolocation exchange. In some examples, the RCS node 106 may support multiple instantiations of a same device, that is, a single MSISDN being associated with multiple devices.

In some examples, the presence server 104 may comprise a server device that receives, stores, and sends presence information associated with one or more UEs. For instance, the presence information may comprise one or more status indicators that convey capabilities and/or availability of the one or more UEs for communicating with other one or more UEs. The presence server 104 may communicate with the RCS node 106 and/or other nodes of the IMS core network 108 in order to facilitate receiving and sending the presence information.

In some embodiments, the first UE 102(A) may comprise a cell phone, a smartphone, a smart watch, a laptop computer, a desktop computer, a smart home device, a tablet device, an Internet-of-Things device, or other types of devices or mobile devices that communicate via the IMS core network 108. In some instances, the first UE 102(A) may comprise a device identifier that is unique to the particular first UE 102(A). The device identifier may comprise a universally unique identifier (UUID), an International Mobile Equipment Identity (IMEI), or even an absence of an identifier value which, in some examples, may be associated with a particular type of device (e.g., iPhone®) and may, therefore, function as a device identifier by default. In some examples, the first UE 102(A) may be associated with a subscriber number, such as an MSISDN value. The first UE 102(A) may be associated with a single MSISDN value or with multiple MSISDN values. The MSISDN value associated with the first UE 102(A) may change over time and/or may be associated with other UEs. In some instances, the device identifier and/or the MSISDN value may comprise information stored at and/or extracted from a subscriber identity module (SIM) card of the first UE 102(A).

In some embodiments, the RCS node 106, the presence server 104, the first UE 102(A), and/or other elements of the IMS core network 108 may comprise one or more memory device(s) and/or one or more processor(s). The one or more memory device(s) may comprise non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, a quantum-state storage device, genetic encoding storage device, or any other medium that can be used to store information for access by an electronic device.

The one or more processor(s) may comprise a microprocessor, a microcomputer, a microcontroller, a digital signal processor, a central processing unit (CPU), a graphics processing unit (GPU), a quantum processor, etc. Among other capabilities, the one or more processor(s) may operate to fetch and execute computer-readable instructions stored in the one or more memory device(s) to perform the operations disclosed herein.

In some examples, a second UE 102(B) (which may be a similar, identical, or different type of device as the first UE 102(A)) may send a second publish message to the presence server 104 to store information about the second UE 102(B) at the device capabilities server. In fact, system 100 may include any number of UEs publishing to the presence server 104 that is supported by the processing, memory, and traffic load capacities of the IMS core network 108, the RCS node 106, and the presence server 104. As discussed in greater detail below regarding FIG. 2, a heterogeneous mix of devices having different built-in hardware capabilities and/or application capabilities may publish to the presence server 104. In some instances, one or more devices of the heterogenous mix may not publish at all because the one or more devices may not include a presence client. As discussed in greater detail below, one or more capabilities of one or more non-publishing devices may be implied based, in some instances, on a UUID of one or more devices (sharing a same MSISDN with the non-publishing device(s)) that do publish. The publishing process is discussed in greater detail below regarding FIG. 3.

In some examples, a third UE 102(C) may send a subscribe message to the presence server 104. The subscribe message may include information identifying a terminating or target UE for which the third UE 102(C) (or the "requesting" or "subscribing" UE) is seeking information, such as a device identifier (e.g., an IMEI or a UUID)) and/or a subscriber identifier (e.g., an MSISDN) of the target UE. The presence server 104 may send a notify message to the third UE 102(C) in response to receiving the subscribe message. The notify message may include information about the target UE and one or more capability indicators of the target UE. In some examples, the presence server 104 may send the notify message including one or more device capability indicators associated with the second UE 102(B) instead of the first UE 102(A), even if the subscribe message identified the first UE 102(A) as the target UE, as discussed in greater detail below regarding FIGS. 2-6.

Figure 2:
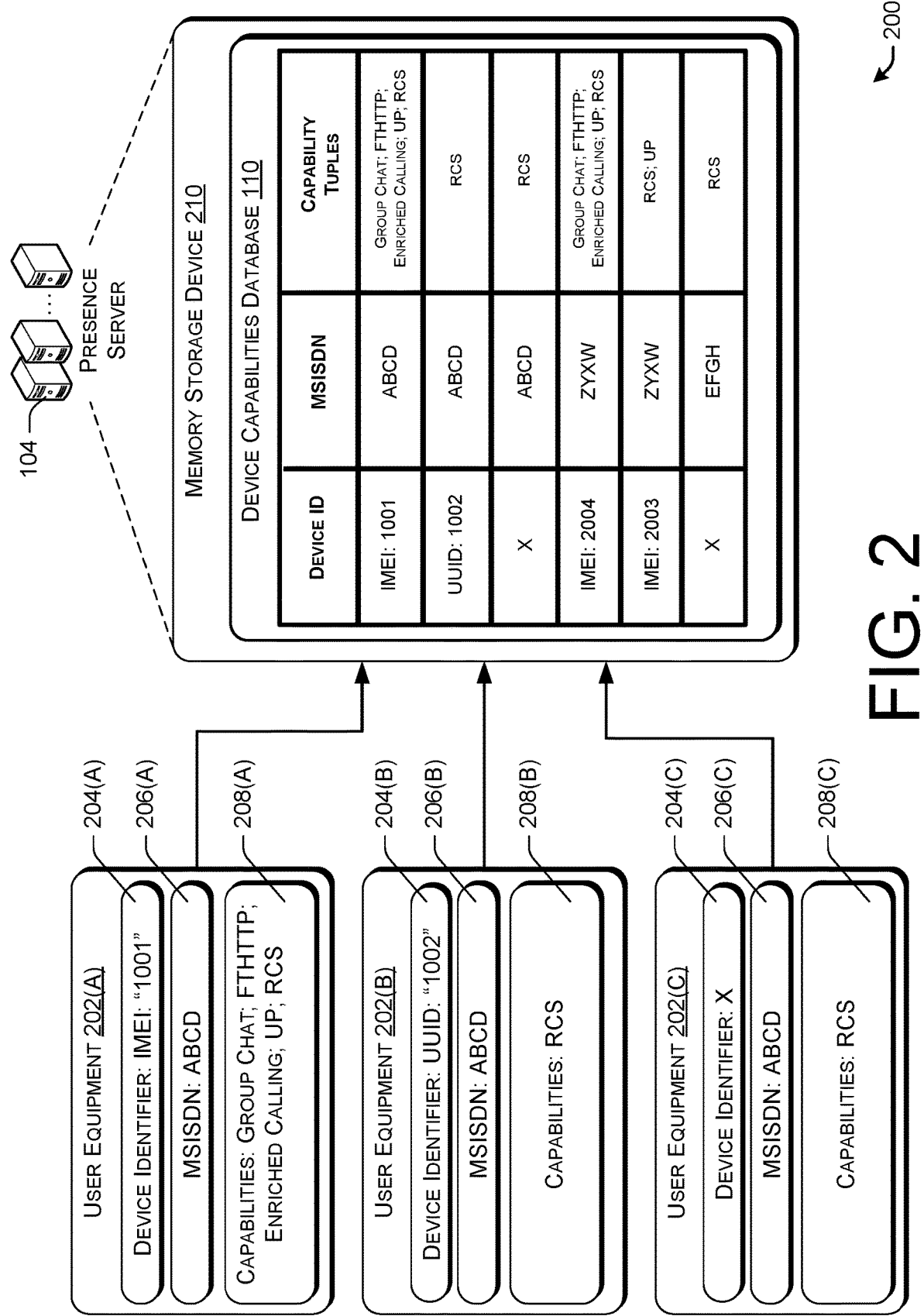
FIG. 2 depicts a schematic diagram of mixed capability devices publishing to a presence server, which may form a portion of the systems, methods, and apparatuses of FIG. 1.

FIG. 2 depicts a schematic diagram of mixed capability UE devices publishing to the presence server 104. For instance, a system 200 (which may be similar or identical to the system 100) may include a first UE 202(A), a second UE 202(B), and a third UE 202(C). UE 202(A), UE 202(B), and UE 202(C) may publish to the presence server 104, as discussed in greater detail below regarding FIG. 3. UE 202(A), UE 202(B), and UE 202(C) may comprise multiple device instantiations of a same device. For instance, UE 202(A) may comprise a first device type (e.g., a Samsung Galaxy S9®), UE 202(B) may comprise a second device type (e.g., a Dell Ultrabook), and UE 202(C) may comprise a third device type (e.g., an iPhone® 6).

In some examples, UE 202(A) may comprise a first device identifier 204(A) comprising a first device identifier type (e.g., IMEI) and a first device identifier value (e.g., "1001") which is particular to the UE 202(A) device, and in some instances may indicate a model and/or manufacturer of UE 202(A). UE 202(A) may include a first MSISDN value 206(A) (e.g., "ABCD") stored in a memory of UE 202(A) that indicates a subscriber of UE 202(A). UE 202(A) may store a first set of one or more device capability indicators 208(A) in memory. For instance, UE 202(A) may comprise an RCS-enabled device via hardware and software embedded in the device by the manufacturer to execute RCS applications. As an RCS-enabled device, UE 202(A) may store various RCS-based messaging enhancement features, including capability indicators to share with other RCS-enabled devices communicating via the RCS applications. For example, UE 202(A) may store the first set of one or more device capability indicators 208(A) such as a group chat indicator, an FTHTTP capability (e.g., file transfer of 100 MB) indicator, and/or an enriched calling capability indicator. UE 202(A) may store a UP capability indicator, an RCS capability indicator, and/or UP and RCS capabilities may be derived from other capability indicators representing capabilities that are included in the RCS or UP suites of services (e.g., group chat and FTHTTP).

In some examples, UE 202(B) may comprise a second device identifier 204(B) comprising a second device identifier type (e.g., UUID) and a second device identifier value (e.g., "1002") particular to UE 202(B). UE 202(B) may comprise a second MSISDN value 206(B) (e.g., "ABCD") and a second set of one or more capability indicators 208(B). In some instances, the second set of one or more capability indicators 208(B) may include an RCS-capable indicator. The second set of one or more capability indicators 208(B) may lack or omit one or more capability indicators of the first set of one or more capability indicators 208(A), such as the group chat capability indicator, the FTHTTP capability indicator, and/or the UP capability indicator. Nevertheless, the second MSISDN value 206(B) of UE 202(B) may comprise a same value as the first MSISDN value 206(A) associated with UE 202(A). In other words, UE 202(A) and UE 202(B) may operate with the same MSISDN value (e.g., subscriber phone number) such that messaging, talk, file transfers, and other data transmitting applications that utilize the MSISDN value to communicate with UE 202(A) may simultaneously communicate with UE 202(B), and any other device instantiations using the same MSISDN value 206(A) and 206(B).

In some examples, UE 202(C) may comprise a third device identifier 204(C), which in some instances may comprise an absence or omission of a device identifier, at least as viewed by the RCS node 106, the presence server 104, and the IMS core network 108. For instance, UE 202(C) may comprise a device that does not implement one or more communication standards, such as RCS or UP. UE 202(C) may comprise a device lacking an IMEI or UUID formatted device identifier. Regardless, the absence of an IMEI or UUID device identifier can in itself act as a device identifier because it may identify at least a subset of devices to which UE 202(C) belongs—devices not implementing IMEI or UUID formatting (e.g., Apple® devices). Accordingly, the absence of a device identifier, or a placeholder value instead of an IMEI or UUID value, may operate as a capability indicator, or lack-of-capability indicator, because one or more RCS and/or UP capabilities may be associated with IMEI type or UUID type device identifiers. In some instances, UE 202(C) may not publish at all (e.g., UE 202(C) may comprise an iPhone® with no over-the-top RCS applications). In some instances, the lack or absence of information extracted from a SIM card may indicate a type of device, for instance, a type of device that does not include a SIM card. UE 202(C) may comprise a third list of capability indicators. For instance, UE 202(C) may include the RCS capability indicator. UE 202(C) may comprise a device that omits RCS or UP hardware and/or software modules embedded into the physical device but, nevertheless, may run one or more applications "over-the-top" that enable one or more RCS capabilities and causes UE 202(C) to store and publish the RCS capability indicator. In some examples, UE 202(C) may include no RCS applications and, therefore, may have no RCS capabilities.

In some embodiments, the presence server 104 may store the device capabilities database 110 in a memory storage device 210, which may comprise any of the memory devices discussed above. The memory storage device 210 may be located at a same physical node as other components of the presence server 104, at a different physical node, or combinations thereof.

The device capabilities database 110 may comprise one or more of a comma delimited list, a spreadsheet, an array, a NoSQL data structure, a hash-based data structure, an object-based data structure, or any other data type, data structure, and/or data system for storing retrievable data in memory. In some examples, the device capabilities database 110 may comprise a spreadsheet with at least a first column for storing one or more device identifier values, a second column for storing one or more MSISND values, and a third column for storing one or more sets of one or more device capability indicators or tuples. A row of the spreadsheet may correspond to a particular device, as represented by the device identifier value of the first column in the row, and the other values of the row may be associated with the device identifier value and/or with each other.

For instance, the first example row illustrated in FIG. 2 includes one or more values that may be associated with the first UE 202(A), such as a device identifier of "IMEI: 1001" indicating the device identifier type of IMEI and the device identifier value of "1001." The second column of the first row includes the MSISDN value "ABCD," and the third column of the first row may include a set of one or more device capability indicator values including "group chat;" "FTHTTP;" "enriched calling;" "UP;" and/or "RCS." Accordingly, the presence server 104 may determine, based on the values stored in the first row, that the device (e.g., UE 202(A)) associated with the device identifier "IMEI: 1001" is associated with the MSISDN value "ABCD" and the device capability indicators of "group chat;" "FTHTTP;" "enriched calling;" "UP;" and "RCS."

The example second row illustrated in FIG. 2 includes one or more values associated with the second UE 202(B), such as a device identifier of "UUID: 1002" (first column); a MSISDN value of "ABCD" (second column); and a set of one or more device capability indicator(s) of "RCS" (third column). Accordingly, UE 202(B) may be associated with a different device identifier ("UUID: 1002") than UE 202(A) (IMEI: 1001). The presence server 104 may determine that UE 202(B) is a distinctly separate and/or different physical device than UE 202(A), for instance based on the first device identifier value 204(A) comprising a different numerical value than the second device identifier value 204(B). The presence server 104 may determine, based on a type of device identifier (e.g., IMEI versus UUID), that UE 202(B) is a different type of device than UE 202(A). In some instances, the presence server 104 may determine a type of device associated with UE 202(A) and/or UE 202(B) based on the type of device identifier in addition to or alternatively to the device identifier value. For instance, the presence server 104 may comprise or access a database that associates various device identifier values and/or device identifier types with device models, manufacturers, and/or built-years. The presence server 104 may, accordingly, determine, based on the device identifier value and/or device identifier type, a particular make and model of the device and, accordingly, the presence server 104 may determine one or more capabilities of the device to associate with the device.

The example third row in FIG. 2 includes a device identifier of "X" (first column); an MSISDN value of "ABCD" (second column); and a set of one or more device capability indicator values of "RCS" (third column). The presence server 104 may determine that a device associated with the third row of data stored in the device capabilities database 110 (e.g., UE 202(C)) is a different particular device and a different type of device than UE 202(A) and UE 202(B), based on the third row of stored data, and/or a set of associations, including the different device identifier value X. The device identifier value X may not indicate any particular device identifier type (e.g., IMEI or UUID) and, in fact, may comprise a placeholder value indicating that UE 202(C) does not include a device identifier value or type recognizable by the RCS node 106. For instance, upon communicating with the presence server 104, UE 202(C) may omit or lack providing any device identifier value or type. The absence of the device identifier value or type received from UE 202(C) may be represented in the device capabilities database 110 as a stored placeholder value, such as "X," "0" "NA" or any other placeholder value to indicate an absence, omission, or lack of recognized device identifier value or type received from UE 202(C). For instance, UE 202(C) may comprise a non-RCS-enabled device (e.g., iPhone®) running an RCS-enabled application to communicate with the RCS node 106 and presence server 104. In other words, UE 202(C) may comprise an "over-the-top" device in that the RCS features are enabled at the application layer and, therefore, no particular device identifier is associated with UE 202(C), even though UE 202(C) can operate some RCS-enabled features via the RCS-enabled application.

As illustrated in FIG. 2, the presence server 104 may determine, based on the one or more values stored in the device capabilities database 110 associated with MSISDN values (e.g., stored in the example second column), that UE 202(A), UE 202(B), and/or UE 202(C) are associated with a same MSISDN value (e.g., "ABCD"). Accordingly, the presence server 104 may determine that a single user or subscriber is associated with the multiple UE 202(A), UE 202(B), and/or UE 202(C) devices, i.e., that the multiple devices are multiple instantiations of the same device.

The presence server 104 may determine that one or more devices (e.g., UE 202(A), UE 202(B) and/or UE 202(C)) are associated with each other via a common MSISDN and, based on this determination, compare, analyze, or otherwise assess the sets of one or more capability indicators associated with the one or more devices relative to each other. For instance, the presence server 104 may determine that, of the devices sharing the common MSISDN, one of the devices has less associated capabilities than other of the devices. The presence server 104 may generate a notify message in response to a subscribe request based, at least in part, on this determination, as discussed in greater detail below regarding FIG. 4.

Figure 3:
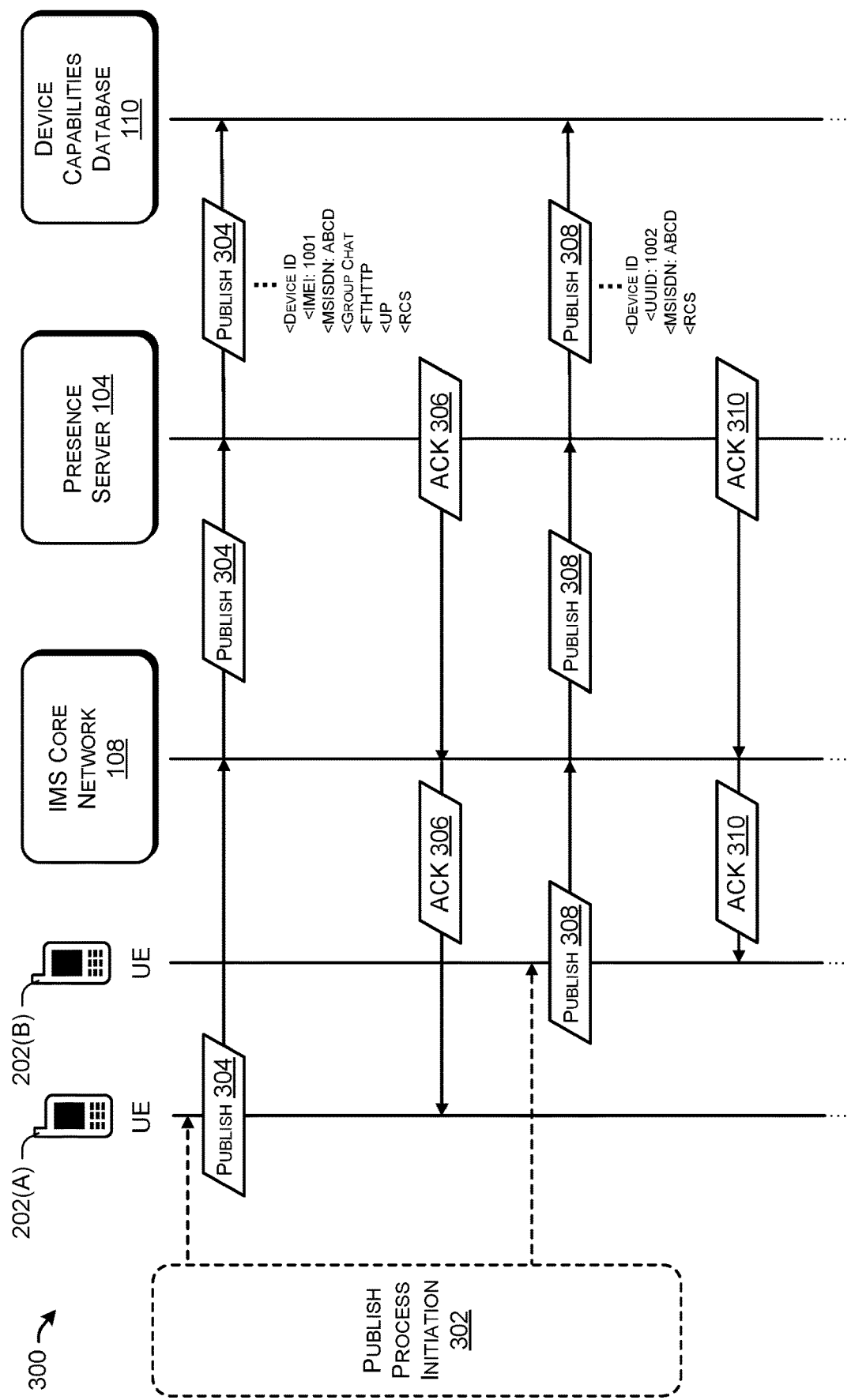
FIG. 3 depicts a call flow diagram illustrating example interactions of the systems, methods, and apparatuses of FIG. 1 during one or more publish processes.

FIG. 3 depicts a call flow diagram illustrating example interactions of the systems disclosed herein during a publish process. For instance, a system 300 (which may be similar or identical to the system(s) 100 and/or 200) may include first UE 202(A) and/or second UE 202(B) in communication with the presence server 104 and the device capabilities database 110 of the presence server 104 via the IMS core network 108.

In some examples, the interactions of system 300 may include a publish process initiation 302, which comprises an operation of UE 202(A) that initiates a process for generating and/or sending a publish message 304. For instance, the publish process initiation 302 may comprise powering up UE 202(A) and/or initiating execution of an RCS-enabled application on UE 202(A). In response to the publish process initiation 302 event, UE 202(A) may generate and/or send the publish message 304 to the presence server 104 via the IMS core network 108.

In some embodiments, the publish message 304 may comprise a Session Initiation Protocol (SIP) message with a body and a header. In some examples, the header may comprise the device identifier type (e.g., IMEI or UUID) and/or device identifier value associated with the first publishing UE 202(A). The header or the body may comprise the MSISDN value associated with the first publishing UE 202(A). The body may contain the set of one or more capability indicators associated with the first publishing UE 202(A).

In some embodiments, the presence server 104 may extract the device identifier type, the device identifier value, the MSISDN value, and/or the set of one or more capability indicators from the publish message 304, for instance, to create a data entry in the device capabilities database 110. The presence server 104 may transform information from the publish message 304 into a new datafile or data entry including associations between the information of the publish message 304 data packet. In response to receiving the publish message 304 and/or storing extracted information from the publish message 304 in the device capabilities database 110, the presence server 104 may generate and/or send an acknowledge (ACK) message 306 to the first publishing UE 202(A), via the IMS core network 108.

In some embodiments, UE 202(B) may publish to the presence server 104. For instance, UE 202(B) may generate and/or send a second publish message 308 in response to the publish process initiation 302 occurring at UE 202(B). The second publish message 308 may comprise a similar format as the first publish message 304. The second publish message 308 may comprise a second header including a second device identifier type (e.g., UUID) and/or a second device identifier value ("1002"); the second header and/or body may include a second MSISDN value (which may be the same value as the first MSISDN value); and the second body may include the second set of one or more device capability indicators (e.g., "RCS").

The presence server 104 my extract information from the second publish message 308 and transform that information into a second new data file or entry comprising associations between different components of the information extracted from the second publish message 308. For instance, information extracted from the second header may be associated with information extracted from the second body. The presence server 104 may send a second ACK message 310 to the second publishing UE 202(B) in response to receiving the second publish message 308 and/or in response to extracting and storing information from the second publish message 308.

Figure 4:
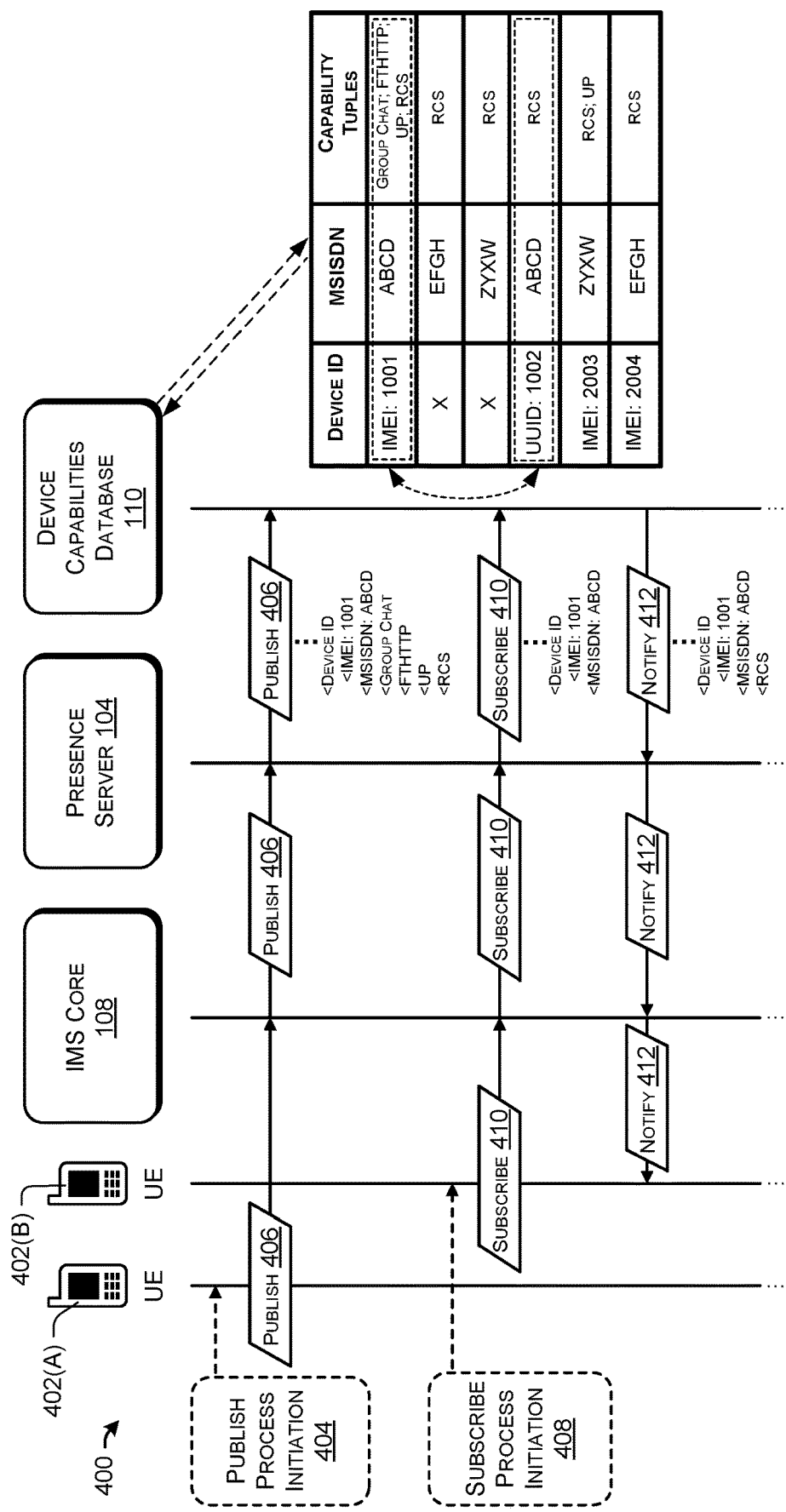
FIG. 4 depicts a call flow diagram illustrating example interactions of the systems, methods, and apparatuses of FIG. 1 during a publish process and a subscribe process.

FIG. 4 depicts a call flow diagram illustrating example interactions of the systems disclosed herein including a publish process and a subscribe process. For instance, a system 400 (which may be similar or identical to the system(s) 100, 200, and/or 300) may include a first UE 402(A) that publishes to the presence server 104 via the IMS core network 108, for instance, using one or more operations described above regarding FIG. 3. A publish process initiation 404 may occur which may cause UE 402(A) to generate and/or send publish message 406 to the presence server 104 which, in turn, transforms the publish message 406 into one or more associations of data values stored in the device capabilities database 110.

In some examples, a subscribe process initiation 408 may occur at a second UE 402(B), causing UE 402(B) to generate and/or send a subscribe message 410 to the presence server 104 via the IMS core network 108. The subscribe process initiation 408 may comprise one or more initiation events, such as UE 402(B) receiving power/being turned on by a user, a UE 402(B) cache expiration occurring (e.g., once every 24 hours, once every 48 hours, once-per-week, or once-per-month), UE 402(B) executing an application, for instance, that accesses contact information stored on UE 402(B), or UE 402(B) adding a phone number or other contact information to a contact information database stored on UE 402(B).

For instance, UE 402(B) may generate and/or send the subscribe message 410 in response to UE 402(B) adding information associated with UE 402(A) as a new contact (e.g., a first MSISDN associated with an alphanumeric name label) into the contact database stored at UE 402(B). In response, UE 402(B) may generate and/or send the subscribe message 410 to the presence server 104 requesting capabilities information stored at the presence server 104 that is associated with the new contact, e.g., UE 402(A). Accordingly, the subscribe message 410 may include a device identifier type and/or device identifier value associated with the device for which capabilities information is sought, or the "target" device (e.g., UE 402(A)). The subscribe message 410 may include the MSISDN value of the target device, or any other information that the presence server 104 may rely on in order to identify data stored in the device capabilities database 110 associated with the target device.

In some embodiments, the presence server 104 may generate a notify message 412 in response to receiving the subscribe message 410. To generate the notify message 412, the presence server 104 may access data stored in the device capabilities database 110. The data may be previously-stored in the device capabilities database 110, or the data may be received via a publish message 406 after the subscribe message 410 is received.

The presence server 104 may identify a first data entry of associated values comprising the first device identifier (e.g., "IMEI: 1001") associated with the first MSISDN (e.g., "ABCD") associated with the first set of device capability indicators (e.g., "group chat, FTHTTP, UP, RCS"). The presence server 104 may identify a second data entry of associated values based, at least in part, on the second data entry including the first MSISDN. The presence server 104 may compare a second device identifier value to the first device identifier value to determine that the second data entry is associated with a different particular device than the first data entry. The presence server 104 may compare a first device identifier type (e.g., IMEI) of the first data entry to a second device identifier type (UUID) of the second data entry to determine that the device associated with the second data entry (e.g., UE 402(B)) is a different type of device than the device associated with the first data entry (e.g., UE 402(A)). Furthermore, the presence server 104 may access previously-stored data indicating that a first device type associated with the first device identifier type has more capabilities than a second device type associated with second device identifier type. In other words, the presence server 104 may determine, based on the different device identifier types of the first data entry and the second data entry, that UE 402(B) has more capabilities than UE 402(A). For instance, the presence server 104 may determine that a device associated with the IMEI device identifier type is more capable than a device associated with the UUID device identifier type, and/or that a device associated with the UUID device identifier type is more capable than (or has the same capabilities as) a device associated with an "X" or another placeholder device identifier.

In some examples, the presence server 104 may compare the first set of one or more capability indicators of the first data entry to the second set of one or more capability indicators of the second data entry, for instance, to determine which of UE 402(A) or UE 402(B) is a lesser-capable device. For instance, the presence server 104 may determine that the second set of one or more device capability indicators lacks or omits one or more device capability indicators that are present in the first set of device capability indicators. The presence server 104 may determine that a signifier indicator representative of UP capabilities (e.g., the FTHTTP capability indicator) is present in the first set of one or more capability indicators associated with the UE 402(A) and/or is absent from the second set of one or more capability indicators associated with UE 402(B) and, based on this determination, that UE 402(A) is a more-capable device and the UE 402(B) is the lesser-capable device.

In some examples, the presence server 104 may access a device association database which may include information grouping one or more device(s) based on determinations that the one or more device(s) comprise multiple instantiations of the same device (e.g., share a same MSISDN). The presence server 104 may maintain determinations of which devices among the one or more associated or grouped devices comprises a least or lesser-capable device, or the device being associated the least amount of capability indicators, or the device being associated with the oldest versions or most out-of-date capability indicators.

In some examples, the presence server 104 may access a capability hierarchy database that includes data associated with multiple device capability indicators that the presence server 104 may receive, and hierarchical associations between the multiple device capability indicators. For instance, the capability hierarchy database may store capability indicators associated with UP-capability, such as group chat, FTHTTP, audio messaging, video share, multiple device instantiations, enriched calling, location sharing and/or live sketching. The capability hierarchy database may associate these capability indicators with more-capable devices, such that the presence of one or more of these capability indicators indicates that the device is a more-capable device when compared to a device that omits one or more of these capability indicators.

The presence of one capability indicator may be indicative of other capability features. For instance, different versions of RCS and UP include different collections of features, and so the presence of a particular capability indicator may indicate a particular RCS or UP version, and therefore the presence server 104 may determine that other capabilities associated with that particular RCS version or UP version are associated with that particular device. For instance, the presence server 104 may determine that a capability indicator for Messaging as a Platform, APIs, or plug-in integration and improved authentication and app security is associated with a UP version 2.0. The presence server 104 may determine that a capability indicator is associated with one of RCS Releases 1-5 of version 1, Release 5.1, Release 5.2 of version 5.0, Release 5.3 of version 6.0, Release 6.0 of version 7.0, Release 7.0 of Version 8.0, Release 8.0 of version 9.0, RCS-e (enhanced), UP version 1.0, version 2.0, version 2.1, version 2.2 or version 2.3. For instance, the presence server 104 may retrieve information from the capability hierarchy database that stores the capabilities of these different versions of RCS and UP in a hierarchical determination.

In some embodiments, the presence server 104 may identify one or more data entries sharing the same MSISDN and determine which of the devices associated with the one or more data entries is a lesser-capable device based on the different sets of one or more capability indicators associated with the one or more data entries. Once a lesser-capable device of the group of devices sharing the same MSISDN is identified, the presence server 104 may generate the notify message 412, which may include the set of one or more device capability indicators associated with the lesser-capable device. For instance, even though subscribing device UE 402(B) identified publishing device UE 402(A) in the subscribe message 410 as the target device, the presence server 104 may provide capability information of a different device (e.g., 202(B)) that is not UE 402(A) in the notify message 412, for instance, based on determining that the different device shares the same MSISDN as the target device, and is also a lesser-capable device with less and/or older versions of features than the target device. The presence server 104 may send the notify message 412 to the subscribing device UE 402(B) via the IMS core network 108.

In some instances, the device capabilities database 110 may store a null value as an IMEI value or an absence of an IMEI value, associated with the target device to indicate that no IMEI entry associated with the target device has been received at the presence server 104. The presence server 104 may determine, based at least in part on the absence of the IMEI value to send the notify message 412 comprising an indication of no-RCS and/or no-UP capabilities. In some instances, the notify 412 message may include data indicating a combination of capabilities associated with the MSISDN corresponding to the target device, as well as the capabilities or lack of capabilities determined based on an omission of an IMEI value.

Figure 5:
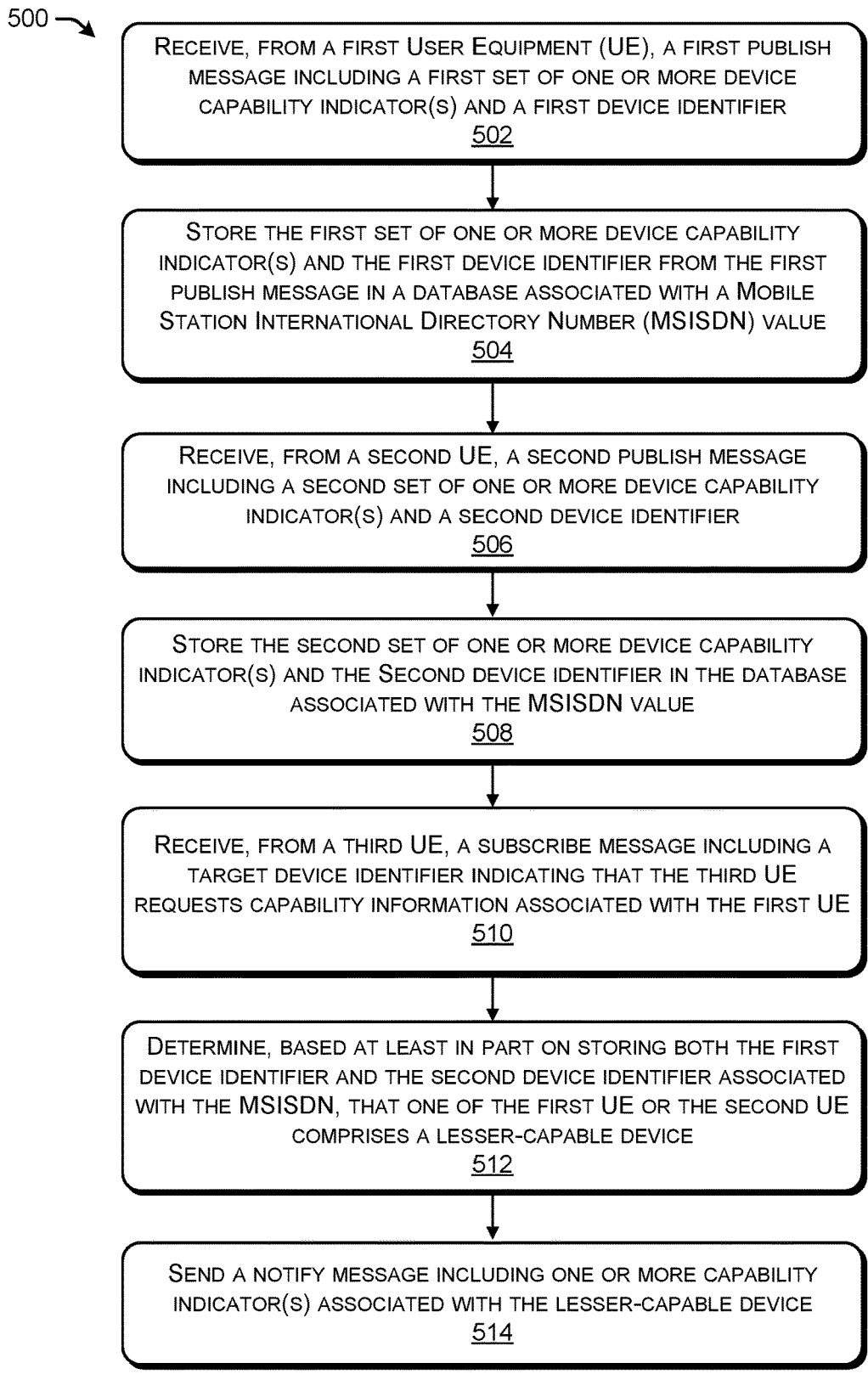
FIG. 5 depicts one or more example operations that may be performed by the systems, methods, and apparatuses of FIG. 1 and may include sending a notify message including a capability indicator associated with a lesser-capable device.

FIG. 5 depicts one or more operations of the systems disclosed herein. For instance, a system 500 (which may be similar or identical to systems 100, 200, 300, and/or 400), at operation 502, may receive, from a first UE, a first publish message including a first set of one or more a device capability indicator(s) and a first device identifier. The first publish message may be received via the IMS core network (e.g., the RCS node) and may indicate that the first UE and/or applications operating on the first UE are RCS-capable and/or UP-capable and would like to be discoverable by other devices attempting to communicate with the first UE.

At operation 504, the system 500 may store the first one or more device capability indicator(s) and the first device identifier from the first publish message in a database associated with a MSISDN value. The MSISDN value may have also been included in the first publish message, and/or the MSISDN value may already be stored in the device capabilities database, e.g., from a previous publish message sent from the first UE. The presence server may extract information from the SIP header and body of the publish message and generate a new data entry stored in the device capabilities database. The new entry may splice any information within the header or body into discrete data values and associate the data values together such that they are associated yet separabley searchable by the presence server. For instance, the device identifier type, the device identifier value, the MSISDN value, and/or one or more capability indicators in the publish message may be extracted and associated together in the device capability database.

At operation 506, the system 500 may receive, from a second UE, a second publish message including a second set of one or more device capability indicator(s) and a second device identifier. The second publish message may indicate whether the second UE and/or applications operating on the second UE are RCS-capable and/or UP-capable and are attempting to be discoverable by other devices.

At operation 508, the system 500 may store the second set of one or more device capability indicator(s) and the second device identifier in the device capabilities database associated with the MSISDN value. In a similar manner to that discussed regarding operation 504, information from the second publish message may be extracted and transformed into multiple separately searchable data associations stored in the device capability database of the presence server.

At operation 510, the system 500 may receive a subscribe message from a third UE, the subscribe message including a device identifier indicating that the third UE requests capability information associated with the first UE. For instance, the subscribe message may include information (e.g., an IMEI, a UUID, and/or an MSISDN) identifying the first UE as a target or terminating device that the third UE wishes to communicate with via one or more RCS-enabled or UP-enabled features of the third UE. The subscribe message may include similar information about the third UE to enable the presence server to generate and send a responsive notify message to the third UE.

At operation 512, the system 500 may determine, based at least in part on storing both the first device identifier and the second device identifier associated with the MSISDN value, that one of the first UE or the second UE comprises a lesser-capable device. For instance, the presence server may access/retrieve information related to one or more device(s) that has been stored at the presence server and is associated with the MSISDN value provided in the subscribe message or associated with the target device otherwise identified in the subscribe message. For the devices that share a same MSISDN value with the target device (e.g., the first UE), the presence server may compare associated capability indicators. For instance, the presence server may search and compare the device capability indicators associated with the other devices to determine which of the devices sharing the same MSISDN value is associated with the least amount of capability indicators, the earliest versions of capability, and/or the oldest capability indicators (e.g., via timestamps associated with the capability indicators). After comparing the capability indicators associated with multiple devices, the presence server may determine that one of the devices (e.g., the first UE, the second UE, or another UE) is the lesser-capable device of the devices that share the same MSISDN value.

At operation 514, the system 500 may send a notify message including a capability indicator associated with the lesser-capable device. For instance, the presence server may copy the set of one or more capability indicators associated with the lesser-capable device into the body of the notify message. In some instances, the presence server may include in the notify message only the one or more capability indicators associated with all of the devices sharing the same MSISDN value, a majority of the devices sharing the same MSISDN value, and/or the capability indicator that is more common than other of the capability indicators among the devices sharing the same MSISDN value.

FIG. 6 depicts one or more operations of the systems disclosed herein. For instance, a system 600 (which may be similar or identical to system(s) 100, 200, 300, 400, and/or 500), at operation 602, may receive, from a requesting UE, a subscribe message seeking capability discovery of a first UE identified by the device identifier included in the subscribe message. For instance, using a process similar to that described in FIG. 3, the presence server may receive a SIP subscribe message via the IMS core network (e.g., as routed by the RCS node). The message may include information necessary for the presence server to search its one or more database(s), such as a device identifier, a MSISDN value, or another digital signature provided in the subscribe message.

At operation 604, the system 600 may identify first data corresponding to the first UE stored in a database, the first data including a MSISDN value and a first set of one or more capability indicator(s). For instance, the presence server may search the device capabilities database for capabilities information extracted from previously received subscribe messages sent by other devices communicating via the IMS core network. The search may be based on the MSISDN value associated with the first UE, the device identifier value associated with the first UE, or other signature indicators that identify associations with the first UE. The search may identify previously-stored information extracted or derived from the publish message received by the first UE, including the first set of one or more capability indicator(s) associated with the first UE and/or previously stored associations with other devices.

At operation 606, the system 600 may identify second data corresponding to a second UE stored in the database, the second data including the MSISDN and a second set of one or more capability indicator(s). For instance, upon identifying information associated with the first UE, the presence server may generate one or more queries, based on the information related to the first UE (e.g., the MSISDN value received in the subscribe message), in order to identify other UEs associated with the first UE, such as the second UE, that may be one of multiple instantiations as the first UE. In other, words, the presence server may identify the second UE by searching for other devices operating with the same MSISDN value because, in some instances, a group of devices sharing a single MSISDN value may receive messages intended for any one of the devices, e.g., messages sent by RCS-enabled and UP-enabled devices and applications. The presence server may identify a second set of one or more device capability indicators associated with the second UE. In some examples, after multiple iterations of operation 606, the presence server may identify multiple sets of one or more capability indicators associated with multiple devices.

At operation 608, the system 600 may determine that the first set of one or more capability indicator(s) or the second set of one or more capability indicator(s) omits a particular capability indicator. In some instances, the system 600 may determine that the first set or the second set lacks a capabilities entry entirely, from which an omission of the particular capability indicator may be determined. The presence server may execute an elimination process applied to the set(s) of one or more capability indicators. For instance, the first UE may be associated with a particular capability indicator (e.g., a UP-enabled indicator), with which the second UE, or another identified UE, is not associated. The presence server may identify one or more common capability indicators, associated with second UE and the first UE, or other combinations of UEs, which may omit the particular capability indicator. The presence server may determine one or more capabilities that are least likely to function on the one or more devices associated with the same MSISDN value and may determine one or more capabilities most likely to function on a greatest number or a largest subset group of the devices associated with the same MSISDN value.

At operation 610, the system 600 may send, to the requesting UE, a notify message omitting the particular capability indicator. For instance, the presence server may generate a notify message, for example, based on address information received from the RCS node for routing messages between the presence server and the requesting UE. The notify message may omit the particular capability indicator and may direct the requesting UE to further communicate with the first UE via protocols that do not or at least attempt to avoid requiring capabilities associated with the omitted particular capability indicator.

Although FIGS. 5 and 6 illustrate example operations, the described operations in these figures (and all other methods and operations disclosed herein) may be performed in other orders different than those illustrated in FIGS. 5 and 6 and multiple steps may be performed simultaneously or in parallel. Furthermore, in some embodiments, one or more operations illustrated in FIGS. 5 and 6 may be omitted, repeated, and/or combined with other operations illustrated in FIGS. 5 and 6, or any other operations and components discussed in this disclosure. In some instances, the operations illustrated in FIGS. 5 and 6 may be performed in multiple iterations for instance, to register a plurality of UEs with the presence server 104 and/or multiple presence servers operating in communication with multiple RCS nodes in a large scale IMS core network. In some examples, one or more operations may be repeated or cycled as the presence server compares multiple sets of one or more capability indicators associated with thousands, or even millions of devices, stored and accessed throughout the large-scale telecommunication network, to determine one or more lesser-capable device associations amongst groups of associated devices.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A server device comprising:
a processor; and
computer-readable instructions that, when executed by the processor, cause the server device to perform operations comprising:
  receiving, from a first user equipment (UE), a first publish message including a Mobile Station International Subscriber Directory Number (MSISDN) and first data associated with the first UE;
  storing, in a database, a first indication associating the first data with the MSISDN;
  receiving, from a second UE, a second publish message including the MSISDN and second data associated with the second UE;
  storing, in the database, a second indication associating the second data with the MSISDN;
  receiving, from a third UE, a subscribe message requesting capability information corresponding to the second UE;
  generating, from the first data, a notify message indicating one or more capabilities associated with the first UE; and
  sending, to the third UE and based at least in part on receiving the subscribe message, the notify message.

2. The server device of claim 1, wherein the first data includes first device capability indicators and the second data includes second device capability indicators, the second device capability indicators being different than the first device capability indicators.

3. The server device of claim 2, wherein generating the notify message is based at least in part on:
determining that the second device capability indicators includes one or more Rich Communication Services (RCS) capability indicators; and
determining that the first device capability indicators omits the one or more RCS capability indicators.

4. The server device of claim 2, wherein generating the notify message is based at least in part on:
determining that the second set device capability indicators includes a Universal Profile (UP) capability indicator; and
determining that the first device capability indicators omits the UP capability indicator.

5. The server device of claim 1, wherein generating the notify message is based at least in part on determining that:
the first data:
  includes a first device identifier comprising a universally unique identifier (UUID); or
  omits any device identifier; and
the second data includes a second device identifier comprising an International Mobile Equipment Identity (IMEI).

6. The server device of claim 1, wherein generating the notify message is based at least in part on determining that the MSISDN is associated with both the first UE and the second UE.

7. A server device comprising:
a processor; and
computer-readable instructions that, when executed by the processor cause the server device to perform operations comprising:
  receiving, from a first user equipment (UE), a subscribe message requesting capability discovery of a second UE identified via a device identifier included in the subscribe message;
  identifying, based at least in part on the device identifier, first data corresponding to the second UE, stored in a database, and including a Mobile Station International Subscriber Directory Number (MSISDN) and first device capability indicators;
  identifying second data corresponding to a third UE, stored in the database, the second data includes the MSISDN and second device capability indicators;
  detecting whether:
    the first device capability indicators includes a Rich Communication Services (RCS) capability indicator; and
    the second device capability indicators includes the RCS capability indicator; and
  based at least in part on the detecting, sending a notify message that includes the MSISDN and:
    includes the RCS capability indicator; or
    omits the RCS capability indicator.

8. The server device of claim 7, wherein the notify message omits the RCS capability indicator based at least in part on the detecting including determining that the second device capability indicators omits the RCS capability indicator.

9. The server device of claim 7, wherein the notify message includes the RCS capability indicator based at least in part on the detecting comprising determining that both the first device capability indicators and the second device capability indicators include the RCS capability indicator.

10. The server device of claim 7, wherein the notify message omits the RCS capability indicator based at least in part on:
the detecting comprises determining that both the first device capabilities indictors and the second device capability indicators include the RCS capability indicator; and
determining that the second data omits a device identifier or SIM card information.

11. The server device of claim 7, wherein the RCS capability indicator includes at least one of a File Transfer over HTTP (FTHTTP) indicator, an at least 100 MB file transfer or greater capability indicator, an open group chat indicator, a 100-device group chat indicator, or an enriched calling indicator.

12. The server device of claim 7, wherein the device identifier comprises at least one of a universally unique identifier (UUID), an International Mobile Equipment Identity (IMEI), or the MSISDN.

13. The server device of claim 7, wherein identifying the second data corresponding to the third UE is based at least in part on determining that the second data is associated with the MSISDN.

14. A method comprising:
receiving, at a server device, a first publish message sent from a first user equipment (UE);

storing, at the server device and based on receiving the first publish message, a first association between:
   a first device identifier;
   one or more first device capability indicators; and
   a Mobile Station International Subscriber Directory Number (MSISDN);
receiving, at the server device, a second publish message sent from a second UE;
storing, at the server device and based on receiving the second publish message, a second association between:
   a second device identifier;
   one or more second device capability indicators; and
   the MSISDN;
receiving, at the server device, a subscribe message requesting information associated with the first UE;
comparing information of the first association to information of the second association;
determining, based at least in part on the comparing, that either the first UE or the second UE comprises a lesser-capable device; and
sending, in response to the subscribe message, a notify message including capability information associated with the lesser-capable device.

15. The method of claim 14, wherein the comparing is based at least in part on a determination that both the first association and the second association include the MSISDN.

16. The method of claim 14, wherein the comparing comprises detecting that:
the one or more first device capability indicators includes at least one of:
   an open group chat capability indicator;
   a File Transfer over HTTP (FTHTTP) capability indicator; or
   a Universal Profile (UP) capability indicator; or
the one or more second device capability indicators omits at least one of:
   the open group chat capability indicator;
   the FTHTTP capability indicator; or
   the UP capability indicator; and
the determining comprises a determination that the second UE is the lesser-capable device.

17. The method of claim 14, wherein the comparing comprises detecting that:
the one or more first device capability indicators omits one or more of:
   an open group chat capability indicator;
   a File Transfer over HTTP (FTHTTP) capability indicator; or
   a Universal Profile (UP) capability indicator; or
the one or more second device capability indicators includes at least one of:
   the open group chat capability indicator;
   the FTHTTP capability indicator; or
   the UP capability indicator and
the determining comprises a determination that the first UE is the lesser-capable device.

18. The method of claim 14, wherein the comparing comprises detecting that the second device identifier comprises an omission in a device identifier data field or an absence of an International Mobile Equipment Identity (IMEI); and
the determining further comprises a determination that the second UE is the lesser-capable device.

19. The method of claim 14, wherein the comparing comprises detecting that the first device identifier comprises an International Mobile Equipment Identity (IMEI), and
the determining further comprises a determination that the second UE is the lesser-capable device.

20. The method of claim 14, wherein the first association is based at least in part on the first device identifier, the one or more first device capability indicators, and the MSISDN being included in the first publish message; or
the second association is based at least in part on the second device identifier, the one or more second device capability indicators, and the MSISDN being included in the second publish message.

\* \* \* \* \*